June 30, 1931.  G. H. FREERS  1,812,474
INTERNAL COMBUSTION ENGINE HEAD
Filed Feb. 28, 1930  2 Sheets-Sheet 1

INVENTOR.
George H. Freers.
BY
Hood & Hahn.
ATTORNEYS

June 30, 1931.  G. H. FREERS  1,812,474
INTERNAL COMBUSTION ENGINE HEAD
Filed Feb. 28, 1930  2 Sheets-Sheet 2

INVENTOR.
George H. Freers,
BY
Hood + Hahn.
ATTORNEYS

Patented June 30, 1931

1,812,474

UNITED STATES PATENT OFFICE

GEORGE H. FREERS, OF INDIANAPOLIS, INDIANA, ASSIGNOR TO MARMON MOTOR CAR COMPANY, OF INDIANAPOLIS, INDIANA, A CORPORATION OF INDIANA

INTERNAL COMBUSTION ENGINE HEAD

Application filed February 28, 1930. Serial No. 432,004.

The object of my invention is to produce a cylinder head for internal combustion engines of such character as to provide a combustion chamber, forming the connection between the cylinder and inlet and exhaust valves that, during the inflow and compression of the explosive mixture a high degree of turbulence will be produced to the end that, when the charge is fired by an ordinary spark plug, a highly efficient combustion of the charge will be attained.

The accompanying drawings illustrate my invention.

Figure 1:
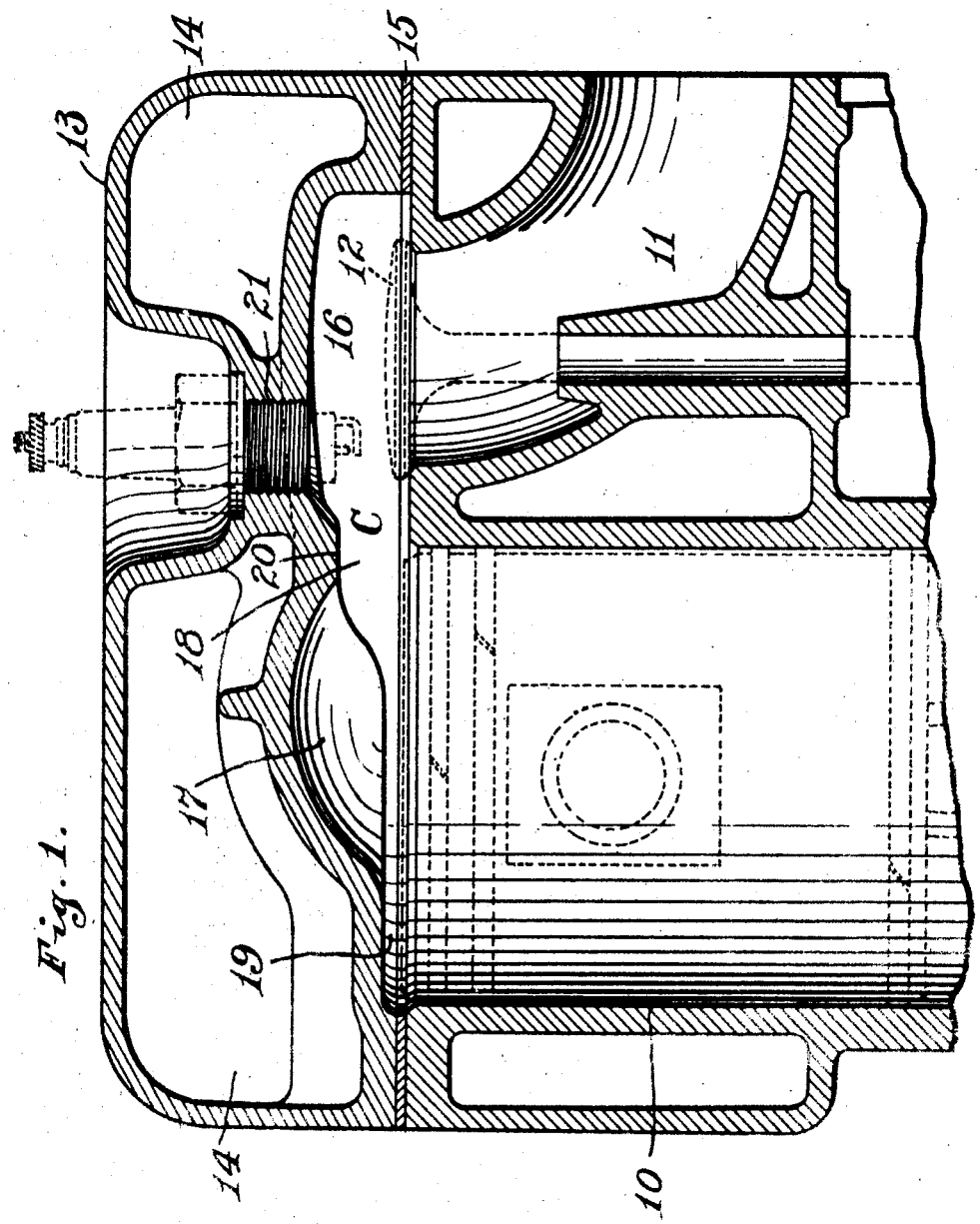
Figure 2:
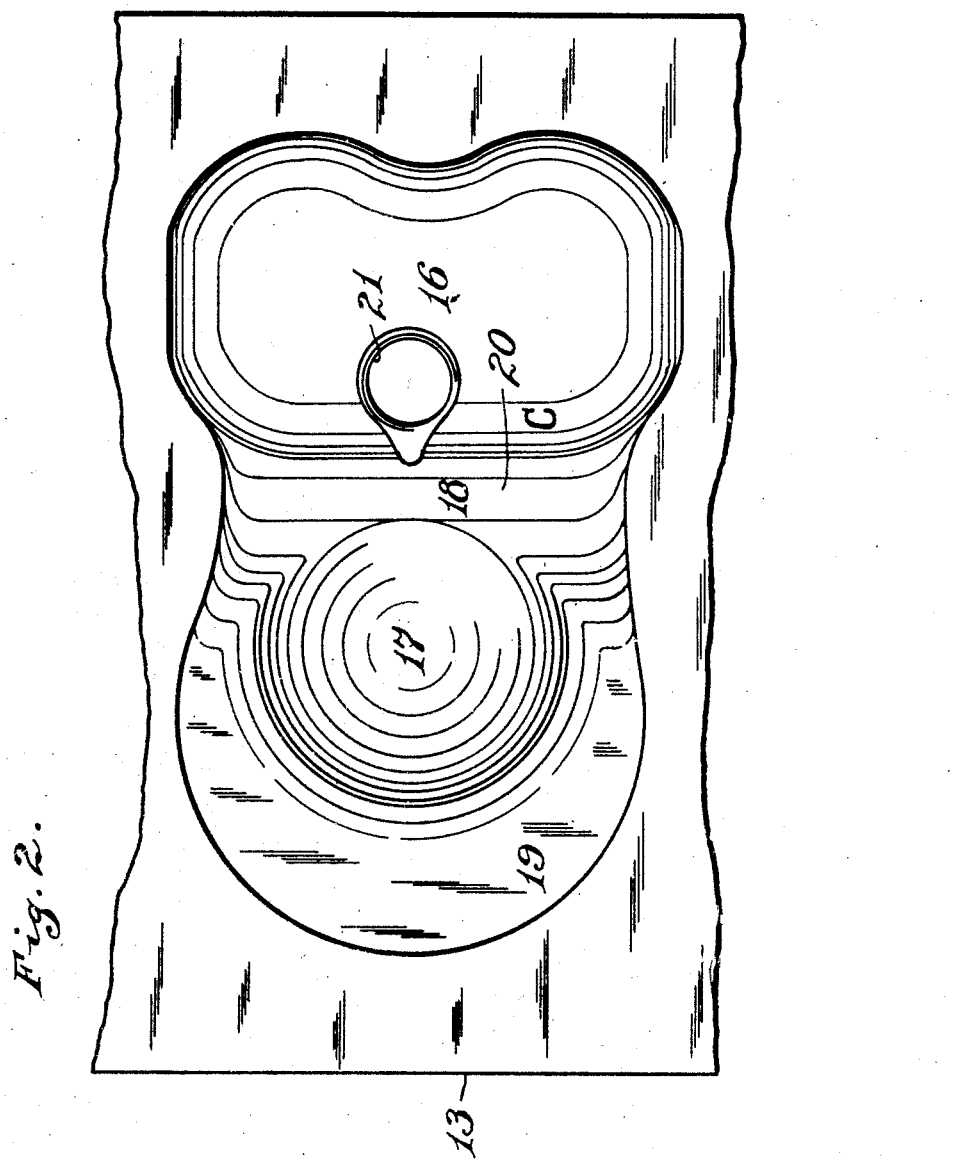

Fig. 1 is a vertical section, diametrical of the cylinder and one gas passage, of a cylinder head embodying my invention, and the adjacent portion of the cylinder block, and Fig. 2 is a plan of the combustion chamber face of my improved head.

In the drawings 10 indicates the cylinder, in which the usual piston is mounted, and 11 the inlet or exhaust passage, the inner end of which is opened or closed by a suitable valve 12, indicated in dotted lines.

My improved head 13 is shown as of the usual water-cooled type having a water cavity 14 and is associated with the upper end of the cylinder block in the usual manner by means of a packing gasket 15 and has formed in its lower face a combustion chamber cavity "C" which comprises a valve chamber 16 contoured to accommodate the inlet and exhaust valves, a dome 17 overlying the end of the cylinder adjacent the valve passages, a connecting throat 18, between portions 16 and 17, and a shallow portion 19 contoured to conform substantially to the arc of that portion of the cylinder which is most remote from the valve passages and merged into the dome space 17.

The entire cavity "C" is so proportioned, relative to the maximum cylinder volume that, when the piston is at the end of its compression stroke, proper desired compression of the charge will be attained.

The throat 18 is formed by dropping a portion of the upper wall of chamber "C", as indicated at 20, between the valve chamber 16 and the dome 17. The minimum cross-sectional area of the throat is at least as great as the area of the maximum opening of the inlet end of the gas inlet passage when the inlet valve is fully opened, and where the chamber 16 merges into the throat 18 and the throat 18 merges into the dome 17 and the dome 17 merges into the space 19, sharp corners are avoided. The maximum horizontal dimension of the dome space 17 is considerably less than the diameter of the cylinder and the throat 18 is vertically above that portion of the cylinder wall which is closest to the gas inlet and exhaust passages. A spark plug opening 21 leads into the valve chamber 16.

While I am not able to state accurately the reasons why my improved combustion chamber causes more efficient operation of the engine, yet nevertheless I have found, by extended tests, that, all other things being the same, an engine in which the compression chamber is not provided with the throat 18, as compared with an engine having a combustion chamber as described above, with the throat 18 proportioned and positioned as described, will deliver considerably less power and the combustion of the charge will be considerably noisier.

I claim as my invention:

1. The combination, with a cylinder and inlet and exhaust passages of an internal combustion engine, of a cylinder head having a combustion chamber formed therein, said combustion chamber comprising a portion overlying the inner ends of the inlet and exhaust passages, a dome portion overlying the cylinder and offset from the axis thereof toward the valve chamber, a throat connecting the valve chamber and dome chamber and overlying that portion of the cylinder wall nearest the valve chamber and having a minimum effective cross-section at least equal to the maximum effective inlet valve opening, and a dome extension, extending to the full diameter of the cylinder and having a dimension axially of the cylinder substantially less than the depth of the dome.

2. The combination, with a cylinder and inlet and exhaust passages of an inlet combustion engine, of a cylinder head having a combustion chamber formed therein, said combustion chamber comprising a portion overlying the inner ends of the inlet and exhaust passages, a dome portion overlying the cylinder and offset from the axis thereof towards the valve chamber, a throat connecting the valve chamber and dome chamber and overlying that portion of the cylinder wall nearest the valve chamber and having a minimum effective cross-section at least equal to the maximum effective inlet valve opening, and a dome extension, extending to the full diameter of the cylinder and having a dimension axially of the cylinder substantially less than the depth of the dome, said extension being defined by a wall substantially at right angles to the axis of the cylinder.

In witness whereof, I GEORGE H. FREERS have hereunto set my hand at Indianapolis, Indiana, this 25th day of February, A. D. one thousand nine hundred and thirty.

GEO. H. FREERS.